(12) United States Patent
Zhang et al.

(10) Patent No.: US 11,641,327 B2
(45) Date of Patent: May 2, 2023

(54) DATA CONSISTENCY AND INTEGRITY FOR ONE-WAY CONNECTED SYSTEMS

(71) Applicant: Microsoft Technology Licensing, LLC, Redmond, WA (US)

(72) Inventors: Yu Zhang, Redmond, WA (US); Pavel Glozman, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

(21) Appl. No.: 17/074,604

(22) Filed: Oct. 19, 2020

(65) Prior Publication Data

US 2022/0124053 A1  Apr. 21, 2022

(51) Int. Cl.
| | |
|---|---|
| *H04L 49/90* | (2022.01) |
| *G06F 9/38* | (2018.01) |
| *H04L 9/06* | (2006.01) |
| *H04L 45/00* | (2022.01) |
| *H04L 67/55* | (2022.01) |

(Continued)

(52) U.S. Cl.
CPC ........ *H04L 49/9042* (2013.01); *G06F 9/3836* (2013.01); *H04L 9/0643* (2013.01); *H04L 45/70* (2013.01); *H04L 67/55* (2022.05); *H04L 67/06* (2013.01); *H04L 67/1097* (2013.01)

(58) Field of Classification Search
None
See application file for complete search history.

(56) References Cited

U.S. PATENT DOCUMENTS

| | | |
|---|---|---|
| 5,703,562 A | 12/1997 | Nilsen |
| 7,675,867 B1 | 3/2010 | Mraz et al. |
| 8,732,453 B2 | 5/2014 | Mraz et al. |

(Continued)

FOREIGN PATENT DOCUMENTS

EP    3598767 A1    1/2020

OTHER PUBLICATIONS

"International Search Report and Written Opinion Issued in PCT Application No. PCT/US2021/043355", dated Oct. 20, 2021, 15 Pages. (MS# 408990-WO-PCT).

(Continued)

*Primary Examiner* — Jay L Vogel
(74) *Attorney, Agent, or Firm* — Chin IP, PLLC

(57) ABSTRACT

Payloads are received via a communication channel having one-way connectivity. The payloads have a container structure that includes a time stamp. It is determined whether a unit manifest has been received via the communication channel transmitted independently of the payloads. The unit manifest includes information associated with payloads including a hash of each payload on the unit manifest. Responsive to determining that the unit manifest has been received, it is determined whether the information associated with the payloads matches the corresponding payloads. Responsive to determining that the information associated with payloads on the unit manifest matches the corresponding payloads, the corresponding payloads are processed. It is determined whether an aggregate manifest associated with a predefined time period has been received. Responsive to determining that the aggregate manifest has been received, it is determined whether aggregate manifest information from the aggregate manifest matches payloads from the predefined time period.

20 Claims, 6 Drawing Sheets

(51) Int. Cl.
*H04L 67/1097* (2022.01)
*H04L 67/06* (2022.01)

(56) References Cited

U.S. PATENT DOCUMENTS

| | | | |
|---|---|---|---|
| 8,984,275 | B2 | 3/2015 | Ozgit |
| 9,130,906 | B1 | 9/2015 | Sheehan |
| 9,189,637 | B2 | 11/2015 | Mevec et al. |
| 9,736,121 | B2 | 8/2017 | Mraz et al. |
| 10,313,721 | B1* | 6/2019 | McLeod ............ H04N 21/8456 |
| 10,735,823 | B2* | 8/2020 | Harden ............. H04N 21/4384 |
| 2002/0156912 | A1 | 10/2002 | Hurst et al. |
| 2003/0182373 | A1* | 9/2003 | Soto ...................... H04L 67/104 |
| | | | 709/204 |
| 2013/0057759 | A1* | 3/2013 | Suess .................... G11B 27/10 |
| | | | 348/E7.024 |
| 2014/0020109 | A1* | 1/2014 | Mraz ................... H04L 63/0227 |
| | | | 726/26 |
| 2014/0355625 | A1* | 12/2014 | Chen ................... H04L 65/1026 |
| | | | 370/468 |
| 2020/0084264 | A1* | 3/2020 | Staubly ..................... G06F 9/54 |

OTHER PUBLICATIONS

Arkhangelskii, et al., "Secure one-way data transfer". In Proceedings of the IEEE NW Russia Young Researchers in Electrical and Electronic Engineering Conference (ElConRusNW), Feb. 2, 2016, pp. 392-395.

Guri, et al., "AirHopper: Bridging the Air-Gap between Isolated Networks and Mobile Phones using Radio Frequencies", In Proceedings of the 9th International Conference on Malicious and Unwanted Software: The Americas (Malware), Oct. 28, 2014, pp. 58-67.

\* cited by examiner

DATA CONSISTENCY AND INTEGRITY FOR ONE-WAY CONNECTED SYSTEMS

BACKGROUND

In systems connected with one-way connectivity only, for example system A to system B, there is no guarantee or indication that any data or collection of data will be transferred entirely or partially, whether the data will be corrupted, or even transferred at all. In such systems, there is also no guarantee of first in, first out (FIFO). That is, in such systems, there is no guarantee that the sequence of files moved from system A to system B are maintaining the same sequence of order.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to systems with one-way connectivity. In some examples, a first plurality of payloads is received via a communication channel having one-way connectivity. In some examples, each payload of the first plurality of payloads is received in a container structure that includes a time stamp that is associated with the payload. In some examples, the communication channel is network-based. In some examples, it is determined whether a unit manifest corresponding to a transaction associated with at least one payload of the first plurality of payloads has been received via the communication channel transmitted independently of the first plurality of payloads.

In some examples, the unit manifest includes information associated with a second plurality of payloads, including, for each payload of the second plurality of payloads, information associated with the payload including a hash of the payload. In some examples, responsive to determining that the unit manifest has been received, it is determined whether the information associated with the second plurality of payloads matches the corresponding payloads. In some examples, responsive to determining that the information associated with second plurality of payloads matches the corresponding payloads, the corresponding payloads are processed. In some examples, it is determined whether an aggregate manifest associated with a predefined time period has been received. In some examples, responsive to determining that the aggregate manifest has been received, it is determined whether aggregate manifest information from the aggregate manifest matches payloads from the predefined time period.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
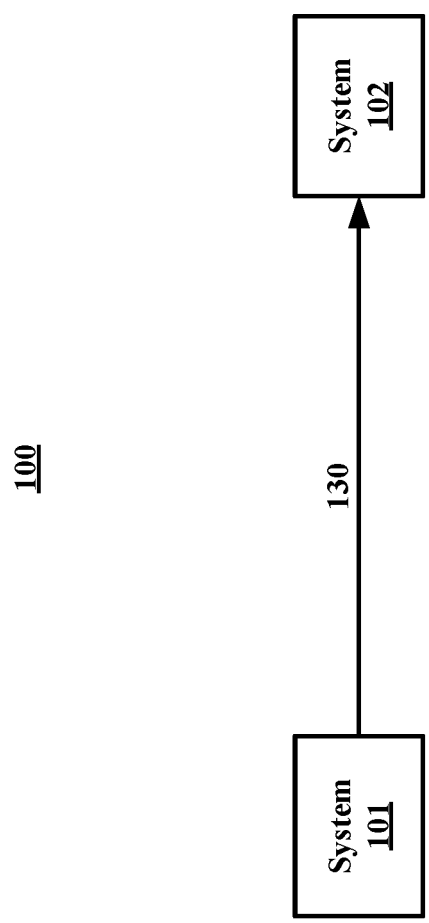
FIG. 1 is a block diagram illustrating one example of a system according to aspects of the disclosed technology.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud, but are devices that serve as an entry point into enterprise or service provider core networks.

Briefly stated, the disclosed technology is generally directed to systems with one-way connectivity. In some examples, a first plurality of payloads is received via a communication channel having one-way connectivity. In some examples, each payload of the first plurality of payloads is received in a container structure that includes a time stamp that is associated with the payload. In some examples, the communication channel is network-based. In some examples, it is determined whether a unit manifest corresponding to a transaction associated with at least one payload of the first plurality of payloads has been received via the communication channel transmitted independently of the first plurality of payloads.

In some examples, the unit manifest includes information associated with a second plurality of payloads, including, for each payload of the second plurality of payloads, information associated with the payload including a hash of the payload. In some examples, responsive to determining that the unit manifest has been received, it is determined whether the information associated with the second plurality of payloads matches the corresponding payloads. In some examples, responsive to determining that the information associated with second plurality of payloads matches the corresponding payloads, the corresponding payloads are processed. In some examples, it is determined whether an aggregate manifest associated with a predefined time period has been received. In some examples, responsive to determining that the aggregate manifest has been received, it is determined whether aggregate manifest information from the aggregate manifest matches payloads from the predefined time period.

In some examples, there is one-way connectivity from a sending system to a receiving system. A transaction may be communicated from the sending system to the receiving system by transmitting one or more payloads, along with a unit manifest that is transmitted independently of the payloads. In some examples, transmissions using the one-way connectivity use a container structure that includes a time stamp and an identification of the payload in the container. In some examples, the transmissions are made to one or more known locations at the receiving system. For instance, each of the known locations may be a storage location such as a file share, a Structured Query Language (SQL) database, other suitable database, a survey, or other suitable location for storing data. The receiving system may scan the known locations periodically to determine whether any new transmissions have been received at any of the known locations.

The unit manifest may include, for each payload of the transaction, information associated with each payload of the transaction. The information may include, for example, for each payload of the transaction: the relative path to the file, the file size, and a hash of the file contents. In some examples, the receiving system can then check the unit manifest against each of the payloads indicated in the unit manifest. In this way, in some examples, the receiving system can verify that each of the payloads associated with the system has been received, and received correctly (for example, that none of the payloads have been corrupted). Also, the receiving system can verify that, for each of the payloads received, a corresponding unit manifest has been received for the payload.

In some examples, the receiving system does not process any payloads until the unit manifest for the payload has been received and it has been verified that every payload indicated in the unit manifest has been received and been correctly received.

The sending system may also send an aggregate manifest, which is a daily manifest in some examples. In the case of a daily manifest, in some examples, the daily manifest is sent to the receiving system each day at a predetermined time. The daily manifest may list each payload sent during the last 24-hour period, or be empty if no payloads were sent during the last 24-hour time period. In one example, the daily manifest lists the relative path segment to each payload that was sent during the last 24-hour time period. The daily manifest may be used, among other things, as a system health check in case no payloads were received, or in case a significant number of payloads were not received.

The system may also be used to verify that out-or-order processing has not occurred. In some examples, if, based on the time stamps, a transmission is received for which it is determined that a later transaction has already been processed, an indication is sent that out-of-order processing has been detected.

Illustrative System

FIG. 1 is a block diagram illustrating one example of a system. As shown, system 100 may include system 101 and system 102. A communication channel 130 exists between system 101 and system 102. Communication channel 130 is a communication channel with one-way connectivity for which communication may occur from system 101 to system 102, but for which communication may not occur from system 102 to system 101. In this way, system 101 is the sending system, and system 102 is the receiving system.

Throughout the specification and the claims, the term "one-way connectivity," with regard to a communication channel, is defined to refer a communication channel for which communication can occur from the sending system to the receiving system, but for which communication cannot occur from the receiving system to the sending system. If there is one-way connectivity between a sending system and a receiving system, this means that communication cannot occur from the receiving system back to the sending system, not even an acknowledgement or any other form of validating that the communication was sent successfully. The term one-way connectivity, as used herein, means that network communication cannot occur from the receiving system to the sending system via the communication channel itself, and also cannot occur through some other means of network communication. For example, if a one-way data flow existed from the sending system to the receiving system, and another one-way data flow also existed from the receiving system back to the sending system, either directly or though one or more intermediaries, that would not be one-way connectivity as defined herein, because there is a data flow back from the receiving system to the sending system in this example. Communication back could occur by one person speaking to another, but not through network communication or the like.

Communication channel 130 is a network-based communication channel with one-way connectivity. In some examples, the communication along communication channel 130 is similar to TCP/IP, UDP, or other suitable communication channel, except that communication is one-way, and no communication, including acknowledgements, can be sent back.

System 101 and system 102 may each include one or more devices, such as one or more computing devices (not shown in FIG. 1). Computing devices in system 101 and 102 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, the computing devices may be individually configured to provide computing, storage, and/or other suitable computing services.

Even though particular components of system 100 are shown in FIG. 1, in other examples, environment 100 can also include additional and/or different components. For example, in certain examples, the system 100 can also include network storage devices, maintenance managers, and/or other suitable components (not shown in FIG. 1).

Communication channel 130 can include one or more network nodes (not shown in FIG. 1) that enable transmission from system 101 to system 102. For example, the network nodes in communication channel 130 may include switches, routers, hubs, network controllers, or other network elements. Communication channel 130 may include one or more computer networks, including wired and/or wireless networks providing one-way connectivity, where each network may be, for example, a wireless network, local area network (LAN), a wide-area network (WAN), or other network providing one-way connectivity. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. However, the above-discussed components and technology may differ from some other implementations in that, for communication channel 130, there is one-way connectivity. Communication channel 130 may include various other networks such as one or more networks using a network protocol that provides one-way connectivity. In essence, communication channel 130 includes any communication method by which information may travel via a network-based method with one-way connectivity from system 101 to system 102.

In certain examples, computing devices in system 100 can be organized into racks, action zones, groups, sets, or other suitable divisions. In some examples, one or more of the computing devices in system 100 is a device that is configured to perform one or more processes described herein.

In some examples, system 101 transmits communications to system 102. In some examples, the communications transmitted from system 101 include atomic transactions, where a transaction includes one or more payloads. The payloads transmitted from system 101 to system 102 via communication channel 130 may be transmitted in a container structure that may include a time stamp and an identification of the payload in the container. In some examples, for each transaction, system 101 also transmits a unit manifest for each transaction. The unit manifest may include information for each payload of the transaction, including, for each payload, an indication of the payload, a hash of the payload, and/or other suitable information.

In some examples, the transmissions are made from system 101 to one or more known locations at system 102. System 102 may scan the known locations periodically to determine whether any new transmissions have been received at any of the known locations. System 102 may then check the unit manifest against each of the payloads indicated in the unit manifest. In this way, the receiving system can determine whether each of the payloads associated with the system have been received, and received correctly (for example, that none of the payloads have been corrupted). After system 102 verifies the unit manifest and each of the payloads indicated on the unit manifest, system 102 may process the payloads.

System 101 may also transmit, independently of the payloads, an aggregate manifest to system 102 via communication channel 130 at each predetermined time interval, such as, for example, each 24 hours. The aggregate manifest may indicate each payload that was communicated from system 101 to system 102 during the predetermined time interval.

Illustrative Computing Device

Figure 2:
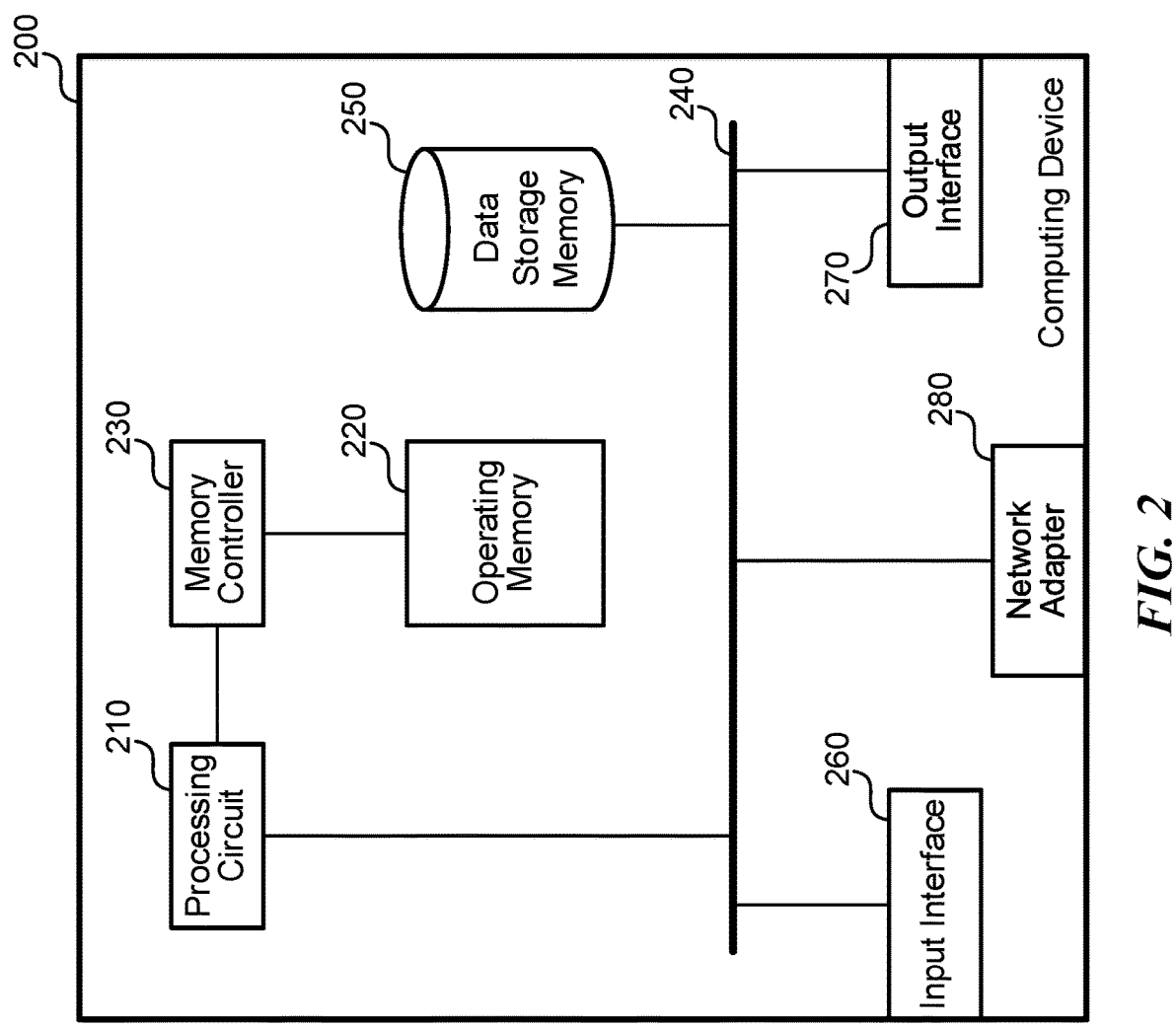
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be a server device such as an application server computer, a virtual computing host computer, or a file server computer, e.g., computing device 200 may be an example of a computing device or network node of system 100 FIG. 1. Likewise, computer device 200 may be an example any of the devices referred to in FIG. 3, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage component 250, e.g., eXecute In Place (XIP).

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions, where the actions may include, in some examples, a method described in one of the flow diagrams discussed below.

Illustrative Process

Figure 3:
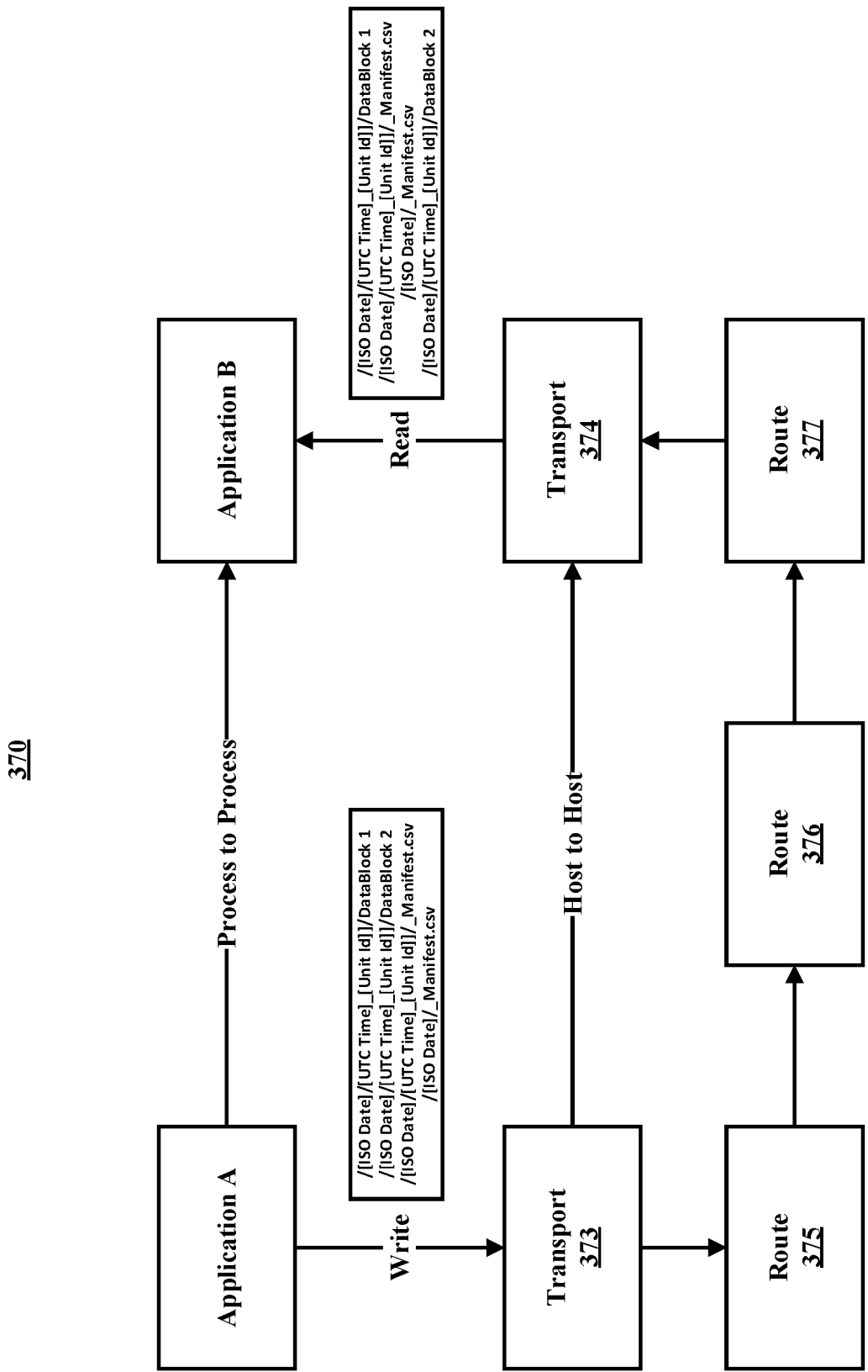
FIG. 3 is a block diagram illustrating an example of a conceptual data flow.

FIG. 3 is a block diagram illustrating an example of a conceptual data flow (370) of an example of communication via one-way connectivity from one application to another application. Conceptual data flow 370 may include application A at a sending system (e.g., sending system 101 of FIG. 1), application B at a receiving system (e.g., receiving system 102 of FIG. 1), transport block 373, transport block 374, route block 375, route block 376, and route block 377.

Communication may occur from application A to application B via one-way connectivity. Communication between application A to application B may occur at the application layer, in a one-way process-to-process communication in which a transaction is communicated from application A to application B. As illustrated in FIG. 3 via a one-way arrow, the application layer communication is a one-way communication from application A to application B.

In some examples, underneath the application layer is the transport layer underlying the application layer communication. In some examples, at the transport layer, one-way host communication occurs via host-to-host communication. The transaction may be communicated by a write action, where the transaction includes one or more payloads and a unit manifest, where each payload, and the unit manifest, is transmitted independently of each other. The transaction may be communicated in a suitable folder structure and/or suitable data structure. For instance, in some examples, each payload communicated in a container structure. In some examples, the container structure includes a creation time stamp and an identification that is associated with the payload. The unit manifest may also include a container structure, which may include a creation time stamp and an identification that is associated with the unit manifest. In some examples, the identification is a unit identification (ID) that is a unique key for the payload. Each payload for the transaction, and the unit manifest, may be communicated via one-way connectivity via the transport layer from transport block 373 to transport block 374. As illustrated in FIG. 3 via a one-way arrow, the transport layer communication is a one-way communication from transport block 373 to transport block 374. In some examples, the communication occurs to a known location at the receiving system, which may be read by application B. The known location may be scanned/polled periodically so that payloads and the unit manifest, communicated in their containers, can be read.

In some examples, underneath the transport layer is the network layer underlying the transport layer communication. In some examples, the transport layer communication is accomplished by an underlying network layer than includes one-way routing communication from one router to another, where each communication from one route to another is a one-way communication, until the receiving system is reached. This is shown abstractly in FIG. 3 via route blocks, where, in some examples, one-way communication occurs from route block 375 to route block 376, and then from route block 376 to route block 377. As illustrated in FIG. 3 via one-way arrows, the network layer communication is made up of one-way communications from routing block to routing block.

In some examples, the communication from application A to application B enables application B to determine whether the any data or collection of data transferred from application A to application B was transferred entirely or partially, corrupted or not corrupted, or transferred at all, as well as determining whether the sequence of files moved from application A to application B are maintained in the same sequence of order as sent from application A so that a FIFO order can be maintained and out-of-order processing prevented. In some examples, the communication from application A to application B enables application B may also ensure transactability and atomicity, so that atomic transactions can be transmitted from application A to application B. In some examples, the communication from application A to application B enables ensures data consistency, data integrity, and ensures that application B is processing data at the level of atomicity.

In some examples, whenever communication is to occur from application A to application B for which it is desired to ensure atomicity in the communication, application A generates a list of artifacts and a unit manifest under the structure of that specific unit. The artifacts are the payloads of the communication. The artifacts/payloads may be any shape of data related to the transactions. For example, an artifact may be a data file, script, extension, file image, or other suitable type of data. In some examples, the unit manifest is created such that the unit manifest has information of each the artifacts under same unit, such as, in some examples, file size, hash, timestamp, and (destination) relative path of the artifact. In some examples, comma-separate values (CSV) files are used for the manifests so that entries can be added using append-only application programming interfaces (APIs) and/or semantics if needed. The unit manifest and the artifacts may then each be transmitted independently from application A to application B to through the one-way connected network, in any order, to a known location using any suitable storage solution, using a suitable data structure, such as the following data structure according to one example:

/[ISO Date]/[UTC Time]_[Unit Id]]
   Individual artifact under that unit
   _Manifest.csv Examples /2020-01-14/16-32-31_@y8zb6yrwd98ffpjjy3nkinr3f15i8jox/Product.json
/2020-01-14/16-32-31_@y8zb6yrwd98ffpjjy3nkinr3f15i8jox/
DZH318Z0BNZR_USD_TE_ST_DC_CN_OD_2019-2-1_ProductMeterRates.json
/2020-01-14/16-32-31_@y8zb6yrwd98ffpjjy3nkinr3f15i8jox/_Manifest.csv In some examples, for each unit, the source system emits a unit manifest in a suitable format. In one example, the unit manifest is emitted as a "_Manifest.csv" CSV file with the following columns (one line per file that was written):
Relative path to file
   File size (in bytes)
   Hash of file contents In some examples, application A may also transmit an aggregate manifest to application B at every predefined time period, which includes an indication of each artifact sent from application A to application B during the predefined time interval since the last aggregate manifest was sent. For instance, in some examples, the aggregate manifest is a daily manifest that is sent at a precise predefined time every 24 hours, and the daily manifest includes an indication of each artifact that was sent from application A to application B over the last 24 hours. In other examples, a suitable time period other than 24 hours may be used. For examples, the aggregate manifest may instead be sent every 6 hours, every 48 hours, or the like. In some examples, the time period at which the aggregate manifest is sent is at least 4 hours—such as 6 hours, 24 hours, 48 hours, 1 week, 2 weeks, or the like. In other examples, the time period is less than 4 hours, such as 3 hours.

In various examples, the aggregate manifest is sent in a suitable format. In some examples, the aggregate manifest is a daily manifest at the day level and is written here: "/[ISO Date]/_Manifest.csv". In some examples, the aggregate manifest contains just the relative path segment to each publish that was started that day, each on its own line. In some examples, if there were no publishes done on a given day, the file should still exist and be empty.

In some examples, application B periodically scans the known location and checks any unit-level structure appearing at the known location. If something is missing, such as the unit manifest being missing, or a payload indicated on a manifest missing, application B may poll periodically for the missing artifact or missing manifest. In some examples, application B checks the unit manifest first, and all artifacts, including the unit manifest, must exist at the system of application B and match the information. In some examples, the information is the hash, file size, and file name attributes, and the checksum is verified. In some examples, if there is a mismatch or the unit manifest is not present with a predefined service level agreement (SLA), application B emits a failure signal.

In some examples, the daily manifest serves as system health check in case there is system glitch so that no unit is transferred. In some examples, application B verifies the presence of the daily manifest on daily base. In some examples, for the daily manifest, if any mismatch detected, such as no unit or not all units being received, application B emits a failure signal.

Application B may deal with potential failures, such as detecting out-of-order transmissions, in different ways in different examples. In some examples, application B re-scans data in N days from the current time, with source system ensuring that any delays do not exceed N days. In some examples, in order to make re-scanning efficient, application B applies a suitable indexing strategy at the unit level. In some examples, each unit data is versioned, with an older version of the unit data being skipped if a more recent version has already been processed.

If a failure is emitted, the receiving system that includes application B may deal with the error in different manners in different examples. In some examples, people at the receiving system may manually talk to the sender, by whatever relevant regulation or process applies. In some examples, the corresponding process is abandoned. There may be a relevant defined regulation or process depending on the context that applies.

Figure 4:
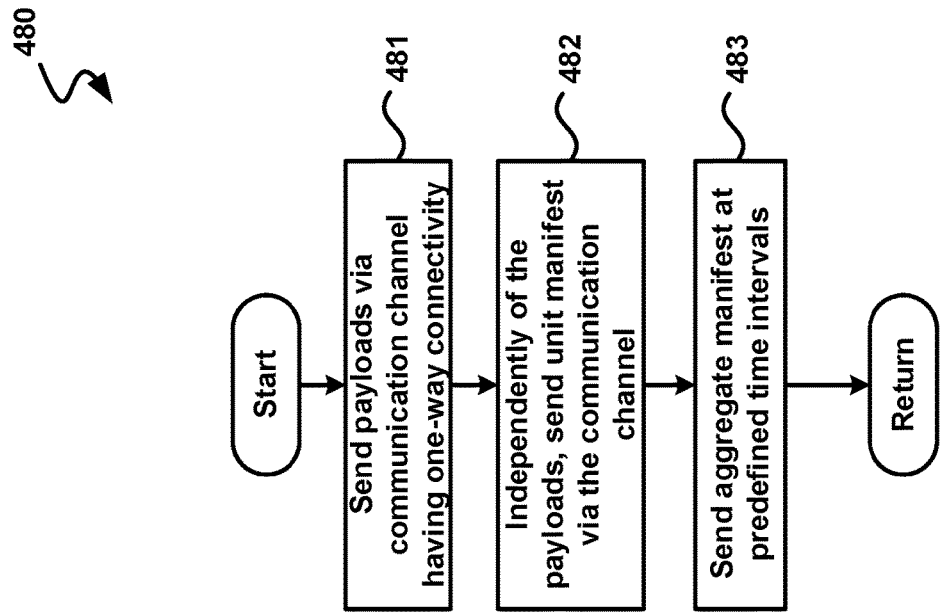
FIG. 4 is a flow diagram illustrating an example of a process for a sending entity.

FIG. 4 is a diagram illustrating an example dataflow for a process (480) for sending communications in a system with one-way connectivity. In some examples, process 480 may be performed by a sending entity, such as an example of system 101 of FIG. 1, an example of application A of FIG. 3, or the like. In the illustrated example, step 481 occurs first. At step 481, in some examples, a first plurality of payloads is sent via a communication channel having one-way connectivity. In some examples, each payload of the first plurality of payloads is in a container structure that includes a time stamp that is associated with the payload, and the communication channel is network-based.

As shown, step 482 occurs next in some examples. At step 482, in some examples, via the communication channel, independently of the first plurality of payloads, a unit manifest corresponding each payload of the first plurality of payloads is transmitted. In some examples, the unit manifest includes information associated with the first plurality of payloads, including, for each payload of the first plurality of payloads, information associated with the payload including a hash of the payload.

As shown, step 483 occurs next in some examples. At step 483, in some examples, at predetermined time intervals, an aggregate manifest associated with a predefined time period is sent. In some examples, the aggregate manifest includes aggregate manifest information. In some examples, the aggregate manifest information includes information from each payload transmitted via the communication channel during the predefined time period. The processing may then proceed to a return block, where other processing is resumed.

Figure 5:
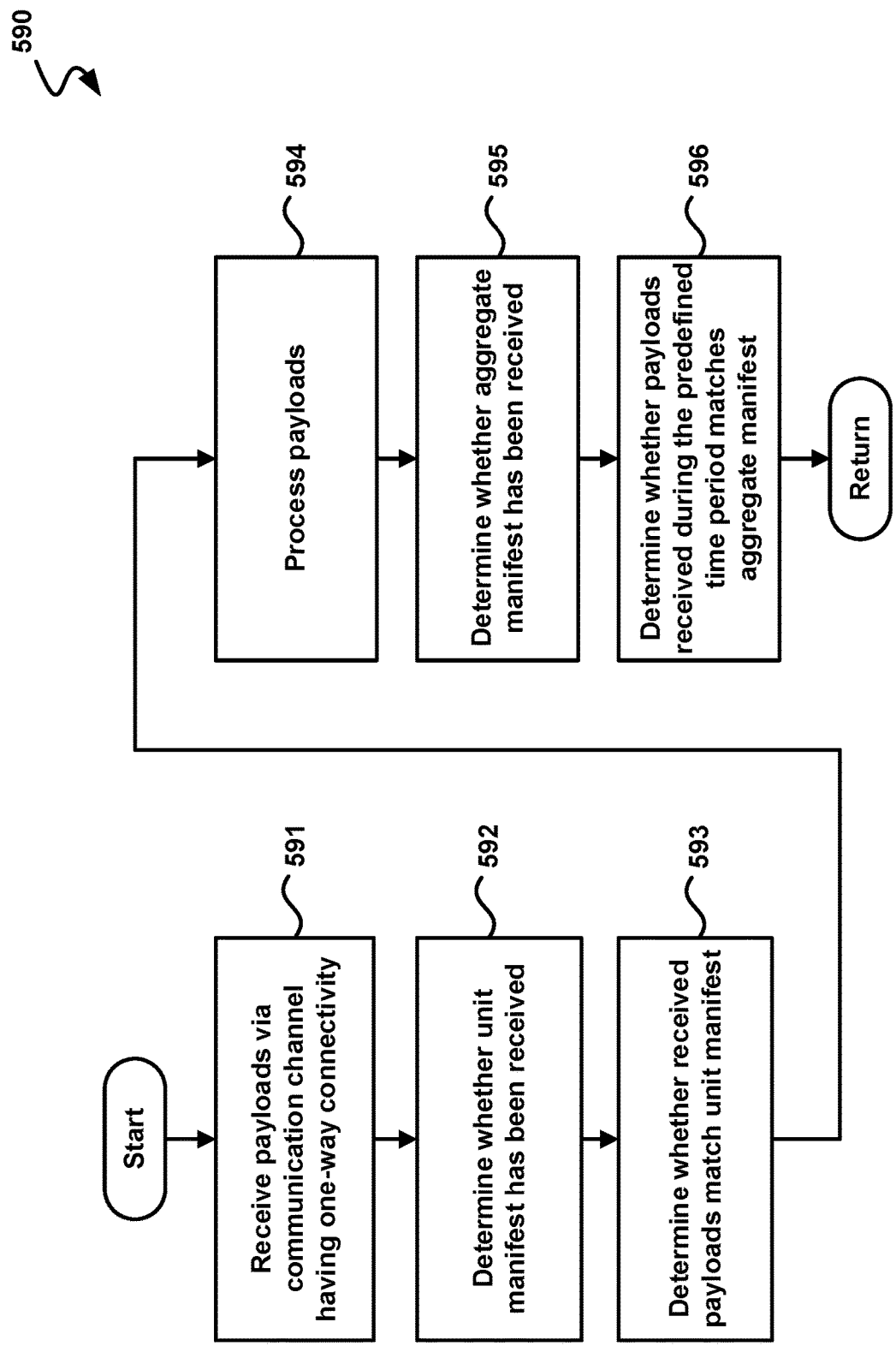
FIG. 5 is a flow diagram illustrating an example of a process for a receiving entity.

FIG. 5 is a diagram illustrating an example dataflow for a process (590) for sending communications in a system with one-way connectivity. In some examples, process 590 may be performed by a receiving entity, such as an example of system 102 of FIG. 1, an example of application B of FIG. 3, or the like. In the illustrated example, step 591 occurs first. At step 591, in some examples, a first plurality of payloads is received via a communication channel having one-way connectivity. In some examples, each payload of the first plurality of payloads is received in a container structure that includes a time stamp that is associated with the payload. In some examples, the communication channel is network-based. As shown, step 592 occurs next in some examples. At step 592, in some examples, it is determined whether a unit manifest corresponding to a transaction associated with at least one payload of the first plurality of payloads has been received via the communication channel transmitted independently of the first plurality of payloads.

As shown, step 593 occurs next in some examples. At step 593, in some examples, responsive to determining that the unit manifest has been received, it is determined whether the information associated with the second plurality of payloads matches the corresponding payloads. In some examples, the unit manifest includes information associated with a second plurality of payloads, including, for each payload of the second plurality of payloads, information associated with the payload including a hash of the payload.

As shown, step 594 occurs next in some examples. At step 594, in some examples, responsive to determining that the information associated with second plurality of payloads match the corresponding payloads, the corresponding payloads are processed. As shown, step 595 occurs next in some examples. At step 595, in some examples, it is determined whether an aggregate manifest associated with a predefined time period has been received. As shown, step 596 occurs next in some examples. At step 596, in some examples, it is determined whether aggregate manifest information from the aggregate manifest matches payloads from the predefined time period. The processing may then proceed to a return block, where other processing is resumed.

Figure 6:
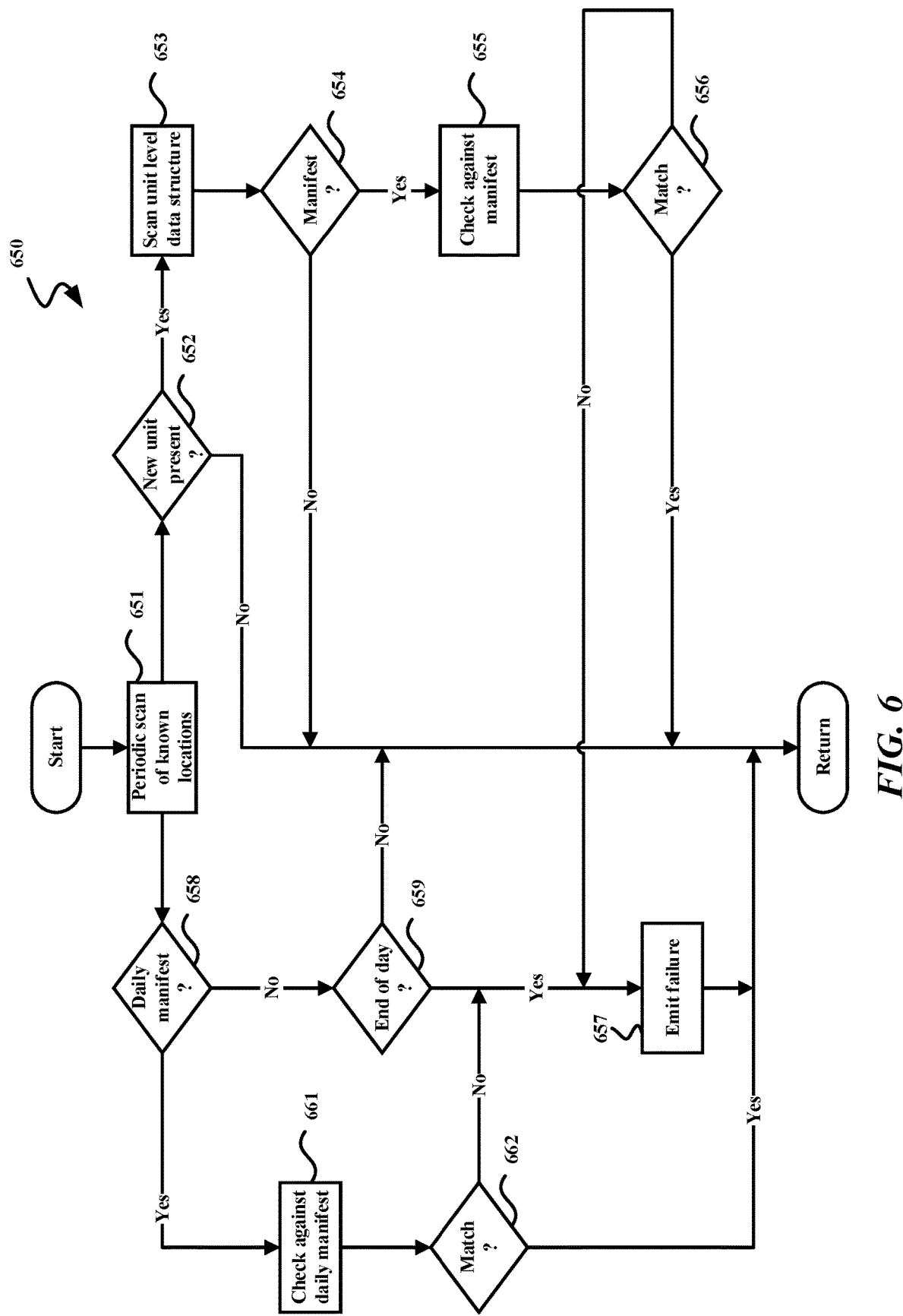
FIG. 6 is a flow diagram illustrating an example of the process of FIG. 5, in accordance with aspects of the present disclosure.

FIG. 6 is a diagram illustrating an example dataflow for a process (650) for receiving communications in a system with one-way connectivity. In some examples, process 650 may be performed by a receiving entity, such as an example of system 102 of FIG. 1, an example of application B of FIG. 3, or the like. In some examples, process 650 may be employed as an example of process 590 of FIG. 5.

In the illustrated example, step 651 occurs first. At step 651, known locations are periodically scanned. As discussed above, the known locations may be file shares, SQL databases, other suitable databases, surveys, other suitable locations for storing data, and/or the like. As shown, the process then moves to decision block 652 and decision block 658 in some examples. At decision block 652, in some examples, a determination is made as to whether a new unit is present. If not, in some examples, the process advances to a return block, where other processing is resumed.

If instead the determination at decision block 652 is positive, step 653 occurs next in some examples. At step 653, in some examples, the unit level data structure of the new unit is scanned. The process then proceeds to decision block 654 in some examples. At decision block 654, in some examples, a determination is made as to whether a (unit-level) manifest exists. If not, in some examples, the process advances to a return block, where other processing is resumed. If instead the determination at decision block 654 is positive, step 655 occurs next in some examples. At step 655, in some examples, the (unit-level) manifest is checked against all artifacts under the unit structure.

In some examples, the processing next moves to decision block 656, where a determination is made as to whether artifacts under the unit structure match the (unit-level) manifest. If so, in some examples, the process then advances to the return block. If instead the determination at decision block 656 is negative, step 657 occurs next in some examples. At step 657, in some examples, a failure is emitted. As shown, the process then moves to the return block in some examples.

At decision block 658, in some examples, a determination is made as to whether the daily manifest is present. If not, the process proceeds to decision block 659 in some examples. At decision block 659, in some examples, a determination is made as to whether the end of the day has been reached. If not, the process advances to the return block in some examples. If instead the determination at decision block 659 is positive, the process moves to block 657.

At block 661, in some examples, all units referenced in the daily manifest are checked. The process then proceeds to decision block 662 in some examples. At decision block 662, in some examples, a determination is made as to whether the units referenced in the daily manifest match the payloads received in the time period defined by the daily manifest. If so, the process advances to the return block in some examples. If not, the process then proceeds to step 657 in some examples.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a device including at least one memory adapted to store run-time data for the device, and at least one processor that is adapted to execute processor-executable code that, in response to execution, enables the device to perform actions, including:
receiving a first plurality of payloads via a communication channel having one-way connectivity, wherein each payload of the first plurality of payloads is received in a container structure that includes a time stamp that is associated with the payload, and wherein the communication channel is network-based;
determining whether a unit manifest corresponding to a transaction associated with at least one payload of the first plurality of payloads has been received via the communication channel transmitted independently of the first plurality of payloads;
responsive to determining that the unit manifest has been received, wherein the unit manifest includes information associated with a second plurality of payloads, including, for each payload of the second plurality of payloads, information associated with the payload including a hash of the payload, determining whether the information associated with the second plurality of payloads matches the corresponding payloads;
responsive to determining that the information associated with second plurality of payloads matches the corresponding payloads, processing the corresponding payloads;
determining whether an aggregate manifest associated with a predefined time period has been received, such that the predefined time period has a predefined duration that is longer than a duration that is associated with the unit manifest; and
responsive to determining that the aggregate manifest has been received, determining whether aggregate manifest information from the aggregate manifest matches payloads from the predefined time period.

2. The apparatus of claim 1, the actions further including: determining, based on the time stamps associated with the first plurality of payloads, whether an out-of-order processing has occurred.

3. The apparatus of claim 1, wherein the aggregate manifest information includes, for each payload sent via the communication channel during the predefined time period, a relative path segment of the payload.

4. The apparatus of claim 1, wherein the unit manifest further includes, for each payload in the second plurality of payloads: a relative path segment of the payload and a file size of the payload.

5. The apparatus of claim 1, wherein the predefined time period is at least four hours in duration.

6. The apparatus of claim 1, wherein the container structure further includes a unique key of the payload.

7. The apparatus of claim 1, wherein receiving the first plurality of payloads is accomplished by scanning a storage location to which each payload of the first plurality of payloads was independently transmitted via the communication channel.

8. The apparatus of claim 7, wherein the storage location is at least one of a file share or a database.

9. A method, comprising:
sending a first plurality of payloads via a communication channel having one-way connectivity, wherein each payload of the first plurality of payloads is in a container structure that includes a time stamp that is associated with the payload, and wherein the communication channel is network-based;

transmitting, via the communication channel, independently of the first plurality of payloads, a unit manifest corresponding to each payload of the first plurality of payloads, wherein the unit manifest includes information associated with the first plurality of payloads, including, for each payload of the first plurality of payloads, information associated with the payload including a hash of the payload; and at predetermined periodic times, sending an aggregate manifest associated with a predefined time period, such that the predefined time period has a predefined duration that is longer than a duration that is associated with the unit manifest, wherein the aggregate manifest includes aggregate manifest information, and wherein the aggregate manifest information includes information from each payload transmitted via the communication channel during the predefined time period.

10. The method of claim 9, wherein the aggregate manifest information includes, for each payload sent via the communication channel during the predefined time period, a relative path segment of the payload.

11. The method of claim 9, wherein the unit manifest further includes, for each payload in the second plurality of payloads: a relative path segment of the payload and a file size of the payload.

12. The method of claim 9, wherein each of the predefined time periods is at least four hours in duration.

13. The method of claim 9, wherein the container structure further includes a unique key of the payload.

14. The method of claim 9, wherein sending a first plurality of payloads is accomplished by independently transmitting, via the communication channel, each payload of the plurality of payloads to a storage location.

15. A processor-readable storage medium, having stored thereon processor-executable code that, upon execution by at least one processor, enables actions, comprising:

obtaining a first plurality of artifacts via a communication channel having one-way connectivity, wherein each artifact of the first plurality of artifacts is received in a format that includes a time stamp that is associated with the artifact, and wherein the communication channel is network-based;

ascertaining whether a unit manifest corresponding to a transaction associated with at least one artifact of the first plurality of artifacts has been received via the communication channel transmitted independently of the first plurality of artifacts;

in response to ascertaining that the unit manifest has been received, wherein the unit manifest includes information associated with a second plurality of artifacts, including, for each artifact of the second plurality of artifacts, information associated with the artifact including a hash of the artifact, ascertaining whether the information associated with the second plurality of artifacts matches the corresponding artifacts;

responsive to ascertaining that the information associated with second plurality of artifacts matches the corresponding artifacts, processing the corresponding artifacts;

ascertaining, based on the time stamps associated with the first plurality of artifacts, whether an out-of-order processing has occurred;

ascertaining whether an aggregate manifest associated with a predefined time period has been received, such that the predefined time period has a predefined duration that is longer than a duration that is associated with the unit manifest; and in response to ascertaining that the aggregate manifest has been received, ascertaining whether aggregate manifest information from the aggregate manifest matches artifacts from the predefined time period.

16. The processor-readable storage medium of claim 15, wherein the aggregate manifest information includes, for each artifact sent via the communication channel during the predefined time period, a relative path segment of the artifact.

17. The processor-readable storage medium of claim 15, wherein the unit manifest further includes, for each artifact in the second plurality of artifacts: a relative path segment of the payload and a file size of the payload.

18. The processor-readable storage medium of claim 15, wherein the predefined time period is at least four hours in duration.

19. The processor-readable storage medium of claim 15, wherein the format is a container structure that includes the time stamp and further includes a unique key of the artifact.

20. The processor-readable storage medium of claim 15, wherein obtaining the first plurality of artifacts is accomplished by polling a storage location to which each artifact of the first plurality of artifacts was independently transmitted via the communication channel.

* * * * *